United States Patent [19]

Roman et al.

[11] 4,147,589
[45] Apr. 3, 1979

[54] CONTROL ROD FOR A NUCLEAR REACTOR

[75] Inventors: Walter G. Roman; Harry G. Sutton, Jr., both of Pittsburgh, Pa.

[73] Assignee: Westinghouse Electric Corp., Pittsburgh, Pa.

[21] Appl. No.: 706,356

[22] Filed: Jul. 19, 1976

Related U.S. Application Data

[63] Continuation of Ser. No. 443,885, Feb. 19, 1974, Published Application No. T942,002.

[51] Int. Cl.² ............................................. G21C 7/08
[52] U.S. Cl. ....................................... 176/36 C; 176/30
[58] Field of Search ................. 176/36, 30; 294/86.17, 294/83 R, 83 A, 83 AB

[56] References Cited

U.S. PATENT DOCUMENTS

| | | | |
|---|---|---|---|
| 1,577,833 | 1/1926 | McCracken | 294/86.17 |
| 3,199,911 | 8/1965 | Alliot et al. | 176/30 |
| 3,212,980 | 10/1965 | Kmonk et al. | 176/36 C |
| 3,486,974 | 12/1969 | Bertone | 176/36 R |
| 3,494,827 | 2/1970 | Zinn | 176/36 R |
| 3,516,703 | 6/1970 | Templeton | 294/86.17 |
| 3,537,743 | 10/1970 | Martinsen | 294/86.17 |
| 3,604,746 | 9/1971 | Notari | 176/36 R |
| 3,720,580 | 3/1973 | Schabert et al. | 176/36 R |
| 3,857,599 | 12/1974 | Jones et al. | 176/36 C |
| 3,932,215 | 1/1976 | Kruger | 176/36 R |
| 4,053,355 | 10/1977 | Vuckovich | 176/36 C |

FOREIGN PATENT DOCUMENTS 1395620  3/1965  France ........................................ 176/30

*Primary Examiner*—Samuel W. Engle
*Assistant Examiner*—S. A. Cangialosi
*Attorney, Agent, or Firm*—Edward L. Levine; Z. L. Dermer

[57] ABSTRACT

A control rod assembly for a nuclear reactor is disclosed having a remotely disengageable coupling between the control rod and the control rod drive shaft. The coupling is actuated by first lowering then raising the drive shaft. The described motion causes axial repositioning of a pin in a grooved rotatable cylinder, each being attached to different parts of the drive shaft which are axially movable relative to each other. In one embodiment, the relative axial motion of the parts of the drive shaft is used either to couple or to uncouple the connection by forcing resilient members attached to the drive shaft into or out of shouldered engagement, respectively, with an indentation formed in the control rod.

9 Claims, 7 Drawing Figures

4,147,589

CONTROL ROD FOR A NUCLEAR REACTOR

This is a continuation of application Ser. No. 443,885, filed Feb. 19, 1974, now Defensive Publication No. T942,002.

BACKGROUND OF THE INVENTION

1. Field of the Invention

This invention pertains to control rods for nuclear reactors and more particularly to control rods having a coupling between the control rod and its associated drive shaft.

2. Description of the Prior Art

A nuclear power plant generates electricity from heat produced by fissioning of a fissile material. The fissile material or nuclear fuel, is contained within fuel assemblies; a plurality of fuel assemblies comprise a nuclear core. In order to extract the nuclear heat produced by fissioning of the fuel, the core is placed within a reactor vessel and a coolant, such as water or liquid sodium, is made to flow through the core so as to transfer the nuclear heat to the reactor coolant. The heated fluid is then used to generate steam which is used to drive conventional steam turbine-electrical generator apparatus.

Control of the reactor is usually achieved by control rods which are dispersed throughout the nuclear core and are mounted for movement into and out of the core. The control rods function by absorbing excess neutrons produced by the nuclear reaction; hence, proper radial distribution of the control rods produces a substantially uniform power distribution across the core. On the other hand, proper axial positioning of the control rods permits the nuclear reactor to achieve design power levels.

Given the above nuclear, thermal, fluid flow, and mechanical functions, and the attendant constraints and requirements associated therewith, it is readily understandable that a complicated and sophisticated structure for supporting the core, a sufficiently rigid coolant flow channeling means, and a precise control rod guide means are necessary within the reactor vessel. Moreover, since most typical commercial nuclear power plants are required to be refueled on the order of once every year, the complete apparatus within the reactor vessel is required to be disassembled in order to allow replacement of the nuclear fuel elements in the core. Further, since the reactor must be positively shut down during the refueling operations to comply with reactor safety standards, the control rods and the control rod guide means are often designed so as to be capable of being left in the core throughout reactor refueling. This, of course, even further complicates the design of the apparatus within the reactor vessel.

In the prior art, the requirement of leaving the control rods in the nuclear core during refueling is achieved by providing a manually operated disconnect joint between the control rod and the control rod drive shaft. However, in this art, the disconnect joints are such that the reactor vessel must be unsealed to allow installation of a special tool which is used to manually actuate the disconnect joint thereby uncoupling the control rod from the drive shaft. Manual actuation of the disconnect joint is also being required to recouple the control rod to the drive shaft. While this prior art type of joint provides for high reliability, there are a number of disadvantages inherently associated with it. For example: a relatively large amount of time is required to wait for the reactor to cool down, both thermally and nuclearly, before the reactor vessel may be unsealed and personnel can safely be present; a relatively long amount of time is necessary for manually disconnecting each of the joints; the long time required to manually disconnect the joints increases the radiation exposure of personnel working on refueling.

SUMMARY OF THE INVENTION

The aforementioned problems of the prior art are overcome by the present invention which provides a disconnect coupling between a control rod and its drive shaft which has a high degree of reliability while allowing for remote coupling and uncoupling of the control rod from the drive shaft by utilizing the actuating force of a control rod drive mechanism.

In one embodiment of this invention, the coupling between the drive shaft and the control rod comprises the engagement of an expandable collet attached to the drive shaft, and axially movable with respect thereto, with one or more grooves formed within the control rod. A rod-like plunger forming the end of the drive shaft and extending through the collet is utilized to expand the collet into mating engagement with the grooves or to release the collet from mating engagement. Hence, the position of the plunger relative to the collet causes engagement or disengagement of the coupling.

The plunger position relative to the collet is obtained by first lowering and then raising the control rod drive shaft. The lowering motion causes a pin which is attached to the collet to rotate a grooved cylinder attached to the drive shaft. The pin is thereby aligned with an axial groove in the cylinder such that the drive shaft is allowed to move in an upward direction relative to the collet. With the plunger in this position, that is, not expanding the collet, a biased resiliency of the collet causes the collet to move inward and out of engagement with the grooves in the control rod.

In order to effectuate engagement of the coupling, the drive shaft is again lowered causing the pin to rotate the cylinder. However, this time the pin is aligned with a groove in the cylinder having a shouldered stop. Since the downward motion of the drive shaft causes the plunger to expand the collect and the stop maintains the axial position of the plunger relative to the collet, engagement of the coupling results.

In another embodiment, a different type of coupling is used in conjunction with a rotating cylinder. In this embodiment, lugs attached to the control rod either interlock with or are free of coacting grooves formed in the cylinder and attached to the control rod to effectuate coupling or uncoupling, respectively. On lowering and then raising the control rod drive shaft, the lugs attached to the control rod cause the cylinder which is attached to the drive shaft to rotate. This results in the lugs attached to control rod being aligned either with a shouldered groove in the cylinder or with a non shouldered groove in the cylinder. The former position results in engagement of the coupling while the latter position results in disengagement of the coupling.

BRIEF DESCRIPTION OF THE DRAWINGS

For a better understanding of the invention, reference may be had to the accompanying drawings in which.

DESCRIPTION OF THE PREFERRED EMBODIMENTS

Figure 1:
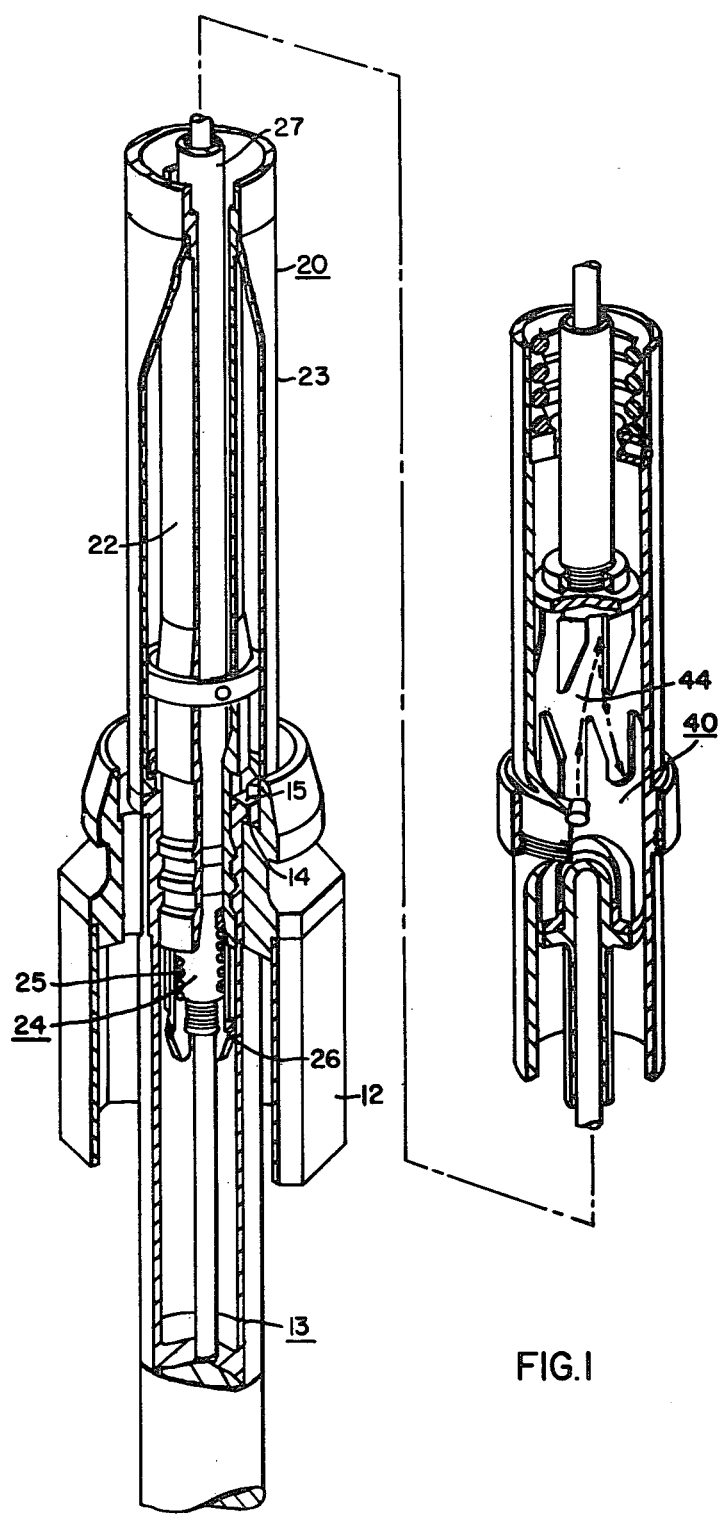
FIG. 1 is an isometric cutaway view of one form of a disconnect coupling as provided by this invention.

Throughout the description which follows, like reference characters indicate like elements in the various figures of the drawings.

Figure 2:
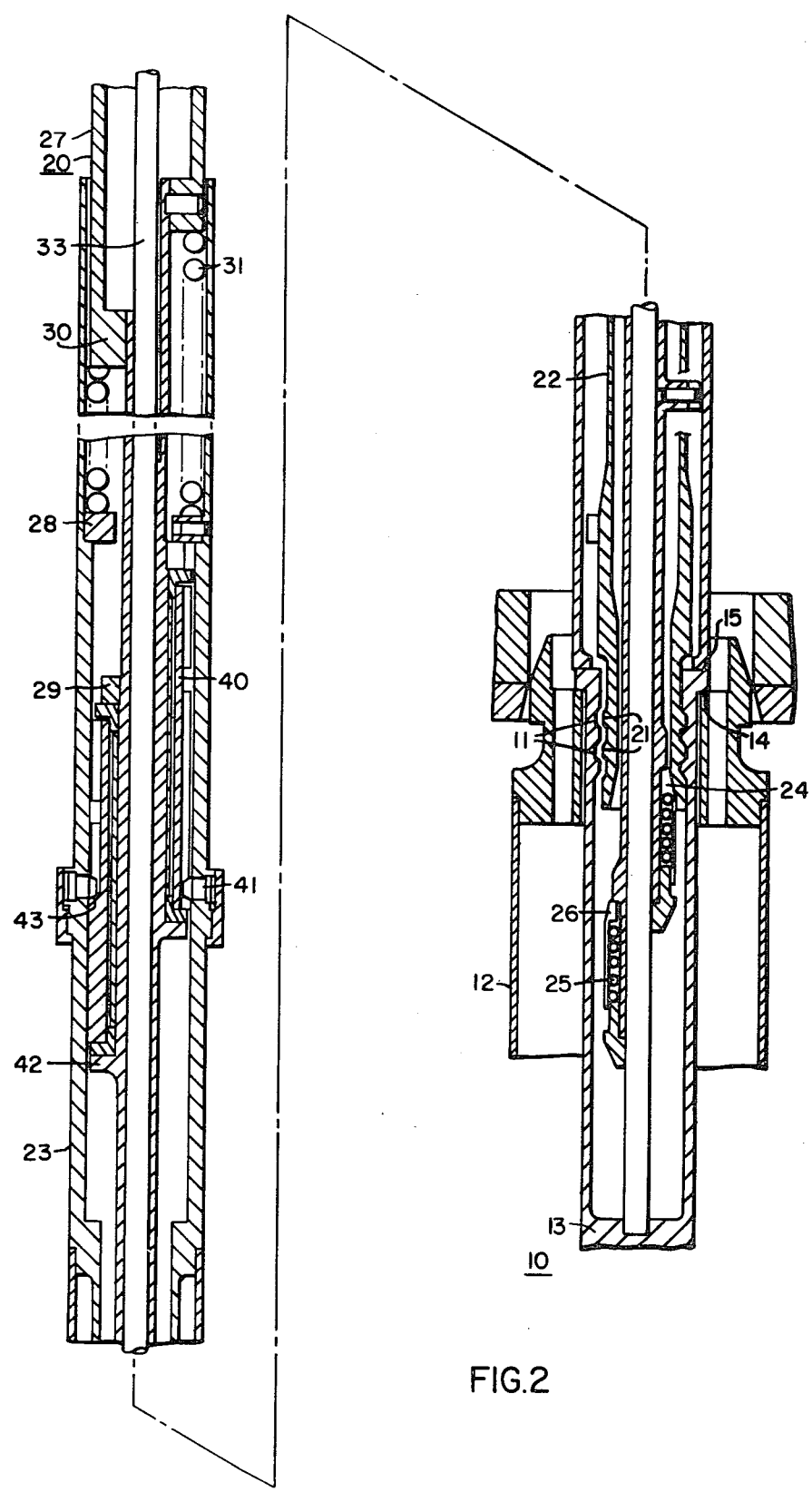
FIG. 2 is a longitudinal sectional view of the disconnect coupling of FIG. 1 illustrating in the right and left halfs of the figures a coupled and an uncoupled position, respectively, of the control rod with the drive shaft.

FIGS. 1 and 2 illustrate one variation of a disconnect coupling between a control rod and a control rod drive shaft as provided by this invention. The item having the reference character 13 represents an uppermost portion of a control rod 10 adapted for movement within a control rod housing 12 which may be used with a water moderated nuclear reactor, a liquid metal cooled nuclear reactor, or other such commercial nuclear power plant. With the control rod 10 fully inserted in a reactor, the uppermost portion 13 will be supported by ledge 14 in the collar of control rod housing 12 and will be positioned somewhat above the active section of a nuclear core (not shown). A drive shaft assembly 20, which is connected to the control rod 10, serves to transmit axial motion supplied by a rod drive mechanism (not shown) to the control rod.

Although the rod drive mechanism and a reactor vessel are not shown, an arrangement is readily envisioned, whereby a plurality of coextensive control rods 10 and housings 12 are contained within a nuclear core and are totally enclosed by a reactor vessel, while each of the shaft assemblies 20 extending respectively from each control rod 10 sealingly penetrates the reactor vessel, and a control rod drive mechanism is mounted to each of the drive shaft assemblies 20 exteriorly of the reactor vessel, but within the sealed environment of the reactor vessel.

As previously mentioned, the rod drive mechanism imparts axial motion to the control rod, the relative axial position of which, with respect to the core, controls the nuclear reaction and the power output. A fully inserted control rod completely shuts down the reactor; a partially withdrawn control rod serves to maintain the level of criticality required to achieve operating conditions. Hence, in order to prevent supercriticality, complete withdrawal of a control rod must be accompanied by other measures which add neutron absorbers to shut down the nuclear reaction. The disconnect coupling between the control rod and the drive shaft assembly provides an alternative to the need for fully withdrawing the control rods and adding neutron absorbers to the nuclear reactor in preparation for core refueling.

In the example illustrated in FIGS. 1 and 2, the coupling between the control rod and the control rod drive shaft consists of the interlocking engagement of a plurality of protrusions with the plurality of grooves. The grooves 11 are formed within an opening in the upper part 13 of control rod 10; the protrusions 21 are formed on the ends of resilient members 22 which extend from a cylindrical member 23. Resilient members 22, which may be manufactured by slitting an appropriately formed cylinder, are biased in a free position to be disengaged from the groove 11 within control rod 10. A plunger assembly 24, passing within an opening circumscribed by resilient members 22 and axially movable with respect thereto, is utilized to spread resilient members 22 into interlocking engagement with control rod 10. Plunger 24 may be equipped with a spring 25 and a sleeve 26 to assure smoothness of operation during spreading of resilient members 22.

In FIG. 2, the relative positions of plunger 24 and resilient members 22 may be seen in the right half when the coupling is engaged, and in the left half when the coupling is disengaged. It is to be observed that resilient members 22 and plunger 24 are both attached to the drive shaft assembly 20. Plunger 24, however, is axially movable with respect to resilient members 22. This is accomplished by forming plunger 24 directly onto the end of drive shaft 27, while resilient members 22 are fixedly connected to cylindrical member 23 which is slidingly mounted onto drive shaft 27. A flange member 28, attached to cylindrical member 23 and extending radially inward therefrom, is positioned between two flange members 29 an 30 which extend radially outward from the drive shaft 27. Thus, cylindrical member 23 is permitted to telescope with respect to drive shaft 27 but is prevented from sliding off of the drive shaft 27. A helical spring 31 is positioned within cylindrical member 23 and between flange members 28 and 30. Spring 31 serves to bias the relative positions of cylindrical member 23 and drive shaft 27 in a manner which will be more fully understood as explained hereinafter.

When the control rod 10 is coupled to the drive shaft assembly 20, the free end of cylindrical member 23 is resting on top of a flange or a surface provided in the upper end 13 of the control rod 10. In order to uncouple the drive shaft from the control rod, the control rod assembly is driven first to its fully inserted position within the nuclear core so that the upper end 13 of control rod 10 rests on ledge 14 in housing 12. Because of the sliding arrangement provided between cylindrical member 23 and the drive shaft 27, when the control rod assembly "bottoms out" the drive shaft 27 is capable of moving downward at additional incremental length. This extra downward motion of the drive shaft 27 causes plunger 24 to move away from or axially downward with respect to resilient members 22. Since the force overcoming the free position bias of resilient members 22 is thereby removed, the control rod drive shaft 27 is disengaged from the control rod 10. Conversely, to couple the control rod with the drive shaft, plunger 24 must move toward or axially upward with respect to resilient members 22. Spring 31 in conjunction with the capability of cylinder member 23 to move telescopically with respect to drive shaft 27 provides the means for the interaction of plunger 24 with resilient members 22.

From the above, it will therefore be appreciated that the relative axial position of the plunger 24 with respect to the ends of resilient members 22 determines whether or not the control rod 10 is coupled to the drive shaft assembly 20. Selection of either of these relative axial positions and positively locking the members in each of these positions is accomplished by sequencing members 40 and 41.

Sequencing member 40 comprises a cylindrical spool which is concentrically mounted to the plunger portion of the drive shaft 27. The mounting is such that the spool may be rotated about the major axis of the drive shaft, but is prevented from moving axially with respect to the drive shaft. Flanges 29 and 42 prevent axial motion of spool 40. Flange 42 is integrally formed with the plunger portion of the drive shaft 27; flange member 29 is threaded onto the drive shaft 27 after assembly of spool 40 to the drive shaft 27.

Sequencing members 41 comprise a plurality of pins which are fixedly attached to cylinder member 23. Although any number of pins 41 may be utilized, the example illustrated employs three pins with each pin being equidistantly spaced around the circumference of cylinder member 23. Sequencing pins 41 are operationally connected to sequencing spool 40 by fitting within grooves formed in sequencing spool 40.

In the left half of FIG. 2, it is seen that the groove in sequencing spool 40 terminates at approximately midplane of the spool forming a shoulder 43. With the sequencing pin 41 held against shoulder 43 by the force exerted by spring 31, the plunger 24 is axially displaced from resilient members 22 thereby disengaging the control rod 10 from the drive shaft 20. In the right half of FIG. 2, the groove in sequencing spool 40 extends the full length of the spool. With the pin 41 in this groove, cylinder member 23 is fully extended with respect to drive shaft 27 such that flange 28 is in contact with flange 29. Also, plunger 24 is drawn up within resilient members 22 forcing resilient members 22 radially outward into engagement with the grooves within the control rod 10 thereby coupling the control rod with the drive shaft.

In accordance with the above, to move the resilient members 22 into engagement with the control rod 10, or conversely to move resilient members 22 out of engagement with the control rod 10, it is necessary to move sequencing pin 41 from a half-length groove into a full-length groove, respectively. This is accomplished by forming the grooves within the sequencing spool 40 in the manner illustrated in FIG. 1. The spool 40 is divided into an upper grooved section and a lower grooved section. Each of the sections being axially spaced by a portion 44 of the sequencing spool 40 having its surface coplanar with the bottom of the grooves. The pattern of the grooves in the upper section of the cylinder is rotated with respect to the pattern of the grooves in the lower section such that each groove lies along a line which substantially bisects the distance between the grooves in the opposite section. Moreover, the entrance to each groove is cut away forming a cammed surface so that the sequencing pin 41 will be guided in its motion from a groove in the lower section into a groove in the upper section, and subsequently into another groove in the lower section.

Figure 3:
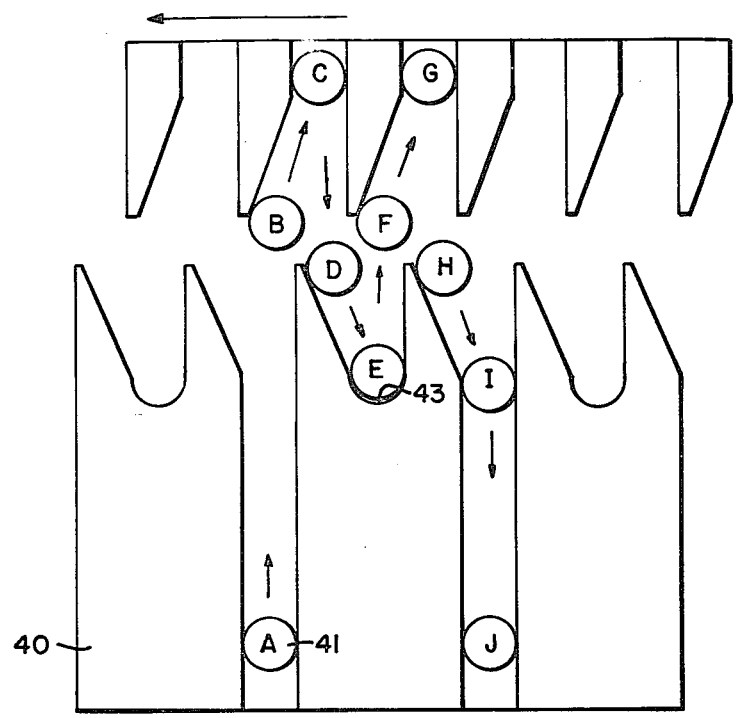
FIG. 3 is a developed sequence of operation of a pin and a grooved cylinder as incorporated in this invention to effectuate coupling or uncoupling of the disconnect coupling.

FIG. 3 depicts the developed surface of the sequencing spool 40 and illustrates the simulated travel of a sequencing pin 41 within the grooves of the sequencing spool 40. When the sequencing pin 41 is in position A, the control rod 10 is coupled to the control rod drive shaft 20, which position corresponds to the right half of FIG. 2. In moving from this coupled position to the uncoupled position, represented by the left half of FIG. 2, the sequencing pin 41 moves from position A to position E. This is accomplished by lowering the control rod assembly to a lowermost position within the nuclear core causing the control rod 10 to bottom out. Downward motion of the drive shaft 27, portion of the drive shaft assembly 20, however, continues with respect to both cylinder member 23 and control rod 10 by compressing spring member 31. This in turn causes the relative position of the sequencing pin 41 within sequencing spool 40 to move from position A to position B, whereupon the sequencing pin 41 contacts the cammed surface of an entrance to a groove in the upper section of the sequencing spool 40. With continued downward axial motion of the drive shaft 27, sequencing spool 40 rotates in the direction indicated in FIG. 3 because of the force exerted by the sequencing pin 41 on the cammed surface. With the sequencing pin 41 at position C, the drive shaft 27 has reached its lower limit of travel. That is, the position of the drive shaft 27 is even more telescoped with respect to cylinder member 23 than that shown in the lower half of FIG. 2. The direction of travel of the drive shaft assembly 20 is then reversed. The force exerted by spring 31 maintains the contact of cylinder member 23 with a ledge 15 in the upper portion 13 of the control rod 10 while the drive shaft 27 is moving axially upward with respect to cylinder member 23. Hence, sequencing pin 41 moves from position C to position D, whereupon it comes in contact with a cammed surface of a groove in the lower section of sequencing spool 40. Spool 40 is again rotated by the force of the pin 41 and the pin 41 comes to rest at position E, at which position it is firmly forced against shoulder 43 by spring 31. The uncoupling operation is now complete and the drive shaft assembly 20 may be lifted free of control rod 10.

In order to recouple the drive shaft assembly 20 with the control rod 10, a procedure generally reversed to that described above is followed. With the control rod 10 of the control rod assembly in a lowermost position within the nuclear core, the drive shaft assembly 20 is lowered until the lower edge of cylindrical member 23 contacts the ledge 15 in the upper portion 13 of the control rod 10. It is to be remembered, that at this time the position of sequencing pin 41 with respect to sequencing spool 40 is as represented by position E in FIG. 3. Continued downward motion of the drive shaft 27 causes the spring 31 to be compressed resulting in relative axial motion, or telescopic motion, between cylinder member 23 and drive shaft 27. As a result, pin 41 moves from position E to position F and then to position G. In moving from position F to position G, sequencing spool 40 must rotate in the direction indicated in FIG. 3. This, of course, is possible since sequencing spool 40 is especially mounted to drive shaft 27 to permit this motion. With sequencing pin 41 at position G, the direction of travel of the drive shaft 27 is reversed so that pin 41 moves to position H, then I. Since position I and position E are in axially coextensive the position of drive shaft 27 with respect to cylindrical member 23 is that depicted in the left half of FIG. 2. However, the full-length groove in the lower section of sequencing spool 40 allows additional relative axial motion between drive shaft 27 and cylinder member 23. During this time, that is, while the drive shaft 27 is moving axially upward, cylindrical member 23 is in firm contact with the ledge 15 in control rod 10. Concurrently, sequencing pin 41 is moving from position I to position J and the plunger 24 is being withdrawn into the space circumscribed by resilient members 22. This forces resilient members 22 radially outward thereby causing the protrusions 21 to interlock with the grooves 11. This completes the coupling of the control rod drive shaft assembly 20 with the control rod 10. Since it will be again necessary to fully lower and then raise the control rod assembly in order to uncouple the control rod drive shaft assembly 20 from the control rod 10, the assembly may be safely operated in any intermediate core position without the possibility of the control rod 10 becoming disengaged from the drive shaft assembly 20.

A position indicator rod 33 is in contact with the control rod 10 in a manner as shown in FIG. 2. Indicator rod 33 telescopically moves with respect to drive shaft 20 when the control rod and the drive shaft are disconnected. Hence, indicator rod 33 serves to indicate whether or not the control rod 10 is engaged with the drive shaft 20.

Figure 4:
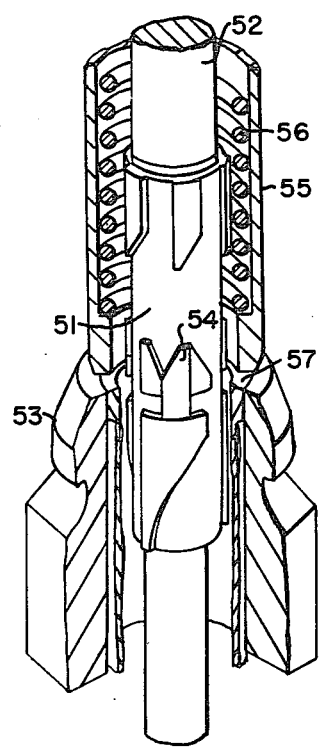
FIG. 4 is an isometric cutaway view of another form of a disconnect coupling constructed in accordance with the principles of this invention.
Figures 5, 6:
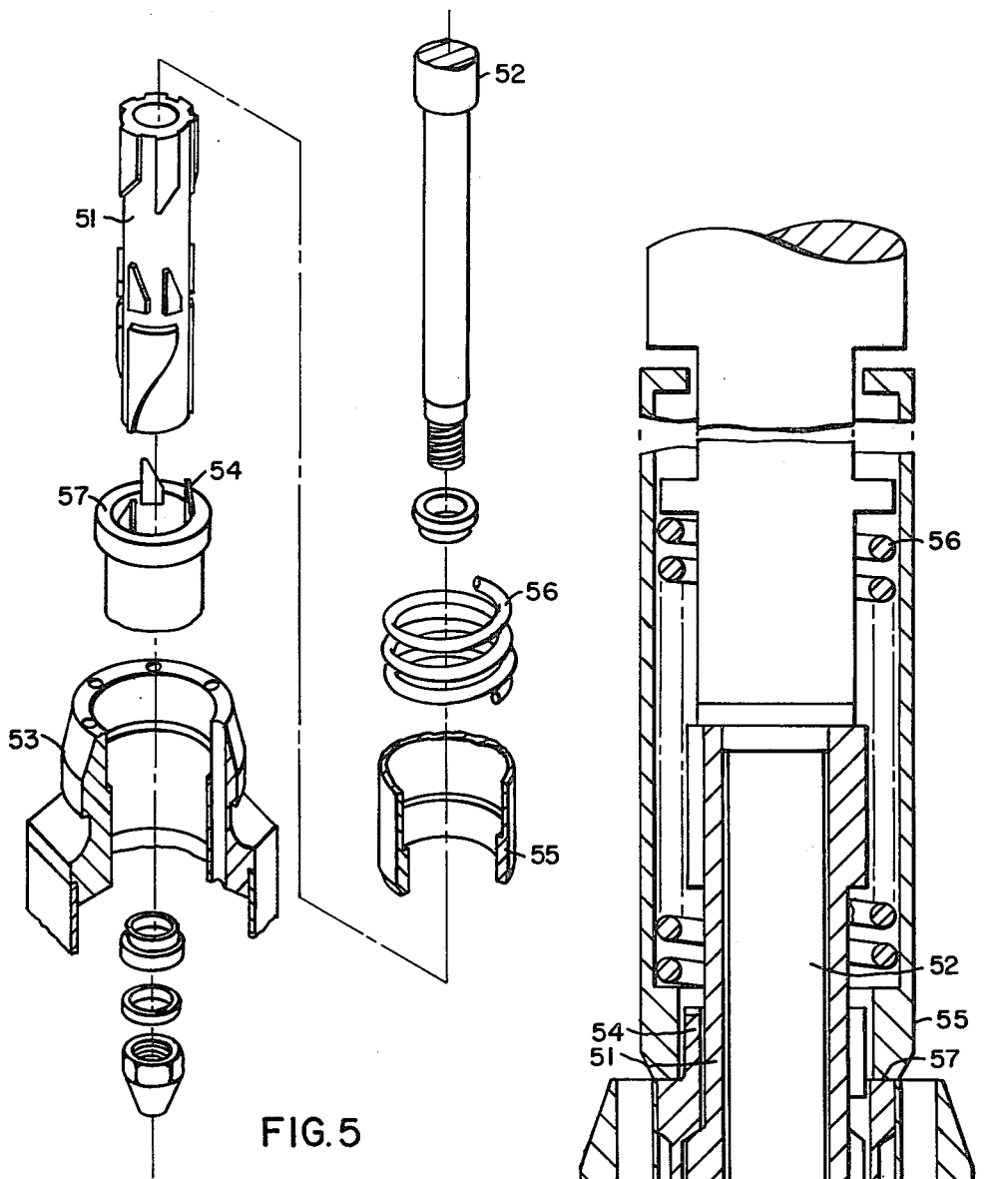
FIG. 5 is an exploded isometric view of the disconnect coupling of FIG. 4.
FIG. 6 is a longitudinal sectional view of the disconnect coupling of FIG. 4.

FIGS. 4, 5 and 6 illustrate another embodiment of this invention. The method of coupling and uncoupling the drive shaft from the control rod again utilizes a downward then an upward motion of the drive shaft as in the previous embodiment. A rotatable sequencing spool 51 having a plurality of cammed grooves formed therein and attached to the drive shaft 52 is also utilized as in the previous embodiment. The main difference between this embodiment and the previous one lies in the method of coupling of the drive shaft 52 of the control rod 53. In this embodiment, a plurality of lugs 54 fixedly connected to the control rod 53 interlockingly engage with the grooves in the sequencing spool 51.

Still referring to FIGS. 4, 5 and 6, a cylinder member 55 and a sequencing spring 56 is connected to the drive shaft 52 such that the drive shaft may be moved telescopically within cylinder member 55 when the bottom edge of cylinder member 55 comes in contact with a ledge 57 on the control rod 53.

Figure 7:
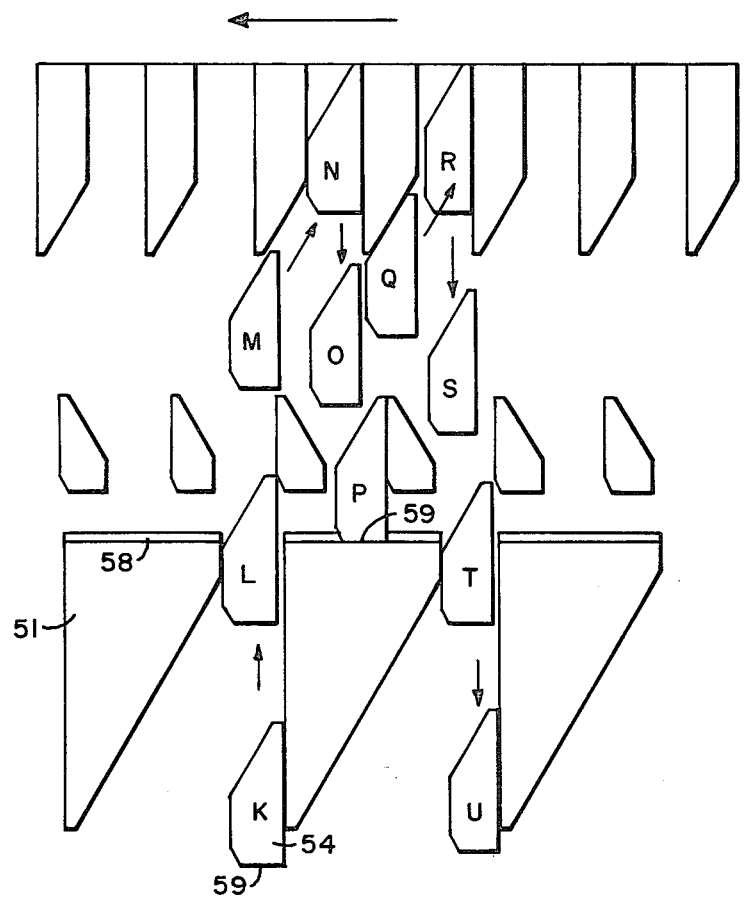
FIG. 7 is a developed sequence illustrating the operation of the disconnect coupling of FIG. 4.

The method of uncoupling the drive shaft 52 from the control rod 53 as well as the developed operation of lugs 54 with respect to sequencing spool 51 is shown in FIG. 7. With the lug 54 at position K, the lug is within a full-length groove in the lower section of sequencing spool 51; therefore, the drive shaft 52 is uncoupled from the control rod 53. Downward motion of the drive shaft 52 causes lug 54 to move relative to sequencing spool 51 from position K, to position L, and then to position M, at which time it contacts a cammed entrance to a groove in the upper portion of sequencing spool 51. The continuing downward motion of the drive shaft 52 creates forces on the cammed surface causing the sequencing spool 51 to rotate in the direction indicated. During this sequence, the lug 54 moves from position M to position N. The direction of travel of the drive shaft 52 is then reversed, whereupon lug 54 moves from position N to position O. In moving from position O to position P, sequencing spool 51 again rotates in the direction indicated thereby aligning lug 54 with a coupling groove in the lower section of sequencing spool 51. When surface 59 of lug 54 is firmly in contact with surface 58 on sequencing spool 51, the drive shaft 52 is coupled with the control rod 53.

Uncoupling the drive shaft 52 from the control rod 53 is accomplished by lowering then raising the drive shaft such that lug 54 moves from position P to position U. During this sequence, spool 51 is rotated by the action of lug 54 on the cammed surfaces of sequencing spool 51 in order to align lug 54 with the full-length groove in sequencing spool 51. With the lug 54 in the full-length groove in spool 51, the drive shaft 52 may be removed from the control rod 53.

It will therefore be appreciated that there has been disclosed a control rod assembly for a nuclear reactor having a control rod which is capable of being remotely disconnected from the drive shaft. Coupling or uncoupling obtains by first lowering then raising the control rod drive shaft. This motion causes either a lug or a pin to rotate a grooved sequencing spool thereby becoming aligned with either a shouldered groove or a through groove, whereby the drive shaft is either coupled or uncoupled, respectively, from the control rod.

Since numerous changes may be made in the above-described apparatus, and different embodiments of the invention may be made without departing from the spirit and scope thereof, it is intended that all the matter contained in the foregoing description or shown in the accompanying drawing shall be interpreted as illustrative and not in a limiting sense.

We claim:

1. A control rod assembly adapted for use in a nuclear reactor, said control rod assembly comprising a control rod having a shoulder, a drive shaft assembly, a coupling connecting said drive shaft assembly to said control rod and cooperating pin and cylindrical detent members connected to said drive shaft for operating said coupling to couple and uncouple said drive shaft assembly from said control rod, said cylindrical detent member being formed to captively hold said pin member in contact with said detent member in one of two axially spaced positions, one position creating coupling and the second position creating uncoupling of the drive shaft assembly from the control rod, said detent member being moved from one position to the other by a predetermined unidirectional rotation of said detent member which results from a lowering and subsequent lifting of said drive shaft assembly, said coupling including a plunger member and a radially biased resilient member having a shoulder cooperatively configured to engage said control rod shoulder, said resilient and plunger members being affixed to said drive shaft assembly and axially movable with respect to one another upon said movement of said detent member so as to radially move said resilient member shoulder into and out of engagement with said control rod shoulder.

2. The control rod assembly of claim 1, wherein said drive shaft assembly includes a rigid drive shaft, said detent member comprising a grooved cylinder which is mounted to said drive shaft for rotational movement thereon, a cylindrical member slidingly mounted onto said drive shaft, said cylindrical member having said pin member fixedly connected to the wall thereof, and a biasing member positioned to act on said cylinder member and said drive shaft such that said pin member is forcefully held in either of said two axially spaced positions in said detent member.

3. The control rod assembly of claim 2, wherein said grooved cylinder includes a pair of axially spaced arrays of grooves formed in said cylinder, with said pair of arrays of grooves being spaced by a portion of said grooved cylinder having its surface coplanar with the bottom surface of said grooves, said groove arrays being rotated relative to each other by an amount substantially equal to one-half the pitch distance between grooves, the entranceway to each groove from said spacing portion of the cylinder having a corner cut away so as to form a cammed surface, said grooves thereby being arranged to rotate said grooved cylinder one pitch distance by the force exerted by said pin member on said cammed surfaces during one lowering and lifting cycle of said drive shaft assembly, and during said lowering and lifting cycle, said pin member being positioned in one of said axial positions and then the other.

4. The control rod assembly of claim 3, wherein said pair of arrays of grooves in said grooved cylinder comprise a first array with each groove extending coextensively, and a second array with adjacent grooves extending alternately to one and then the other of said axially spaced positions of said pin member, said second array thereby having alternate grooves extending coextensively.

5. The control rod assembly of claim 1, wherein said detent member comprises a cylinder mounted to said drive shaft for rotational movement thereon and having two axially spaced arrays of grooves formed therein, said grooves serving to guide said movement of said detent member, said groove arrays being operationally interconnected by a portion of said detent cylinder having its surface coplanar with the bottom surface of said grooves, said groove arrays being rotated relative to each other by an amount substantially equal to one-half the pitch distance between grooves, and the entrance to each groove being cammed.

6. A control rod assembly adapted for use in a nuclear reactor, said control rod assembly comprising a control rod, a drive shaft assembly, a coupling connecting said drive shaft assembly to said control rod and cooperating pin and cylindrical detent members connected to said drive shaft for coupling and uncoupling said drive shaft assembly from said control rod, said detent member being formed to captively hold said pin member in contact with said detent member in one of two axially spaced positions, one position creating coupling and the second position creating uncoupling of the drive shaft assembly from the control rod, said detent member being unidirectionally rotatable such that said pin is positioned in one of said axial positions and then the other, said unidirectional rotation of said detent member resulting from a lowering and subsequent lifting of said drive shaft assembly, said coupling of the control rod with the drive shaft assembly including a shouldered indentation formed within the coupling end of said control rod, and a plurality of resilient members having a shouldered protrusion thereon for engaging with said shouldered indentation to couple the control rod with the drive shaft assembly, said plurality of resilient members being biasly formed radially so as to be normally disengaged from said shouldered indentation, the resilient members being mounted concentric with said drive shaft assembly, and such that an enlarged end of the drive shaft assembly having a cross-sectional configuration greater than an opening circumscribed by said resilient members is located axially adjacent the ends of said resilient members, whereby motion of the drive shaft assembly relative to the resilient members causes said enlarged end of the drive shaft to force the ends of said resilient members radially outward into engagement with said shouldered indentation in the control rod.

7. The control rod assembly of claim 6, wherein said resilient members are mounted to a cylinder member being concentrically mounted to said drive shaft and axially movable with respect thereto, and said axial position of the enlarged end of the drive shaft assembly so as to couple the control rod with the drive shaft by forcing the resilient members into engagement with the indentation in the control rod is fixed by the relative axial position of said pin member in said detent member.

8. A control rod assembly adapted for use in a nuclear reactor, said control rod assembly comprising a control rod, a drive shaft assembly, and a coupling connecting said control rod to said drive shaft assembly, said coupling including cooperating lug and detent means for connecting and disconnecting said control rod from said drive shaft assembly, said detent means including a cylinder mounted to said drive shaft assembly for unidirectional rotational movement thereon and being formed to hold said lug means in engagement therewith so as to connect said drive shaft assembly to said control rod, and to allow said lug means to be disengaged from said detent means so as to disconnect said drive shaft assembly from said control rod, said lug means being moved from engagement to disengagement with said detent means by a predetermined rotation of said detent means which results from a lowering and subsequent lifting of said drive shaft assembly, said detent cylinder further comprising three axially spaced arrays of grooves formed therein, with a first and second of said arrays of grooves being axially adjacent and serving to guide the movement of the lug means from engagement to disengagement with said detent means, and the third array of grooves being axially adjacent said second array and serving to allow axial separation of said lug means from said detent means, each of said arrays of grooves being operationally interconnected by portions of said detent cylinder having its surface coplanar with the bottom surface of said grooves, the first and second of said groove arrays having an equal number of grooves, said first and second groove arrays being rotated relative to each other such that each groove of each array is positioned along an axial line which lies between adjacent grooves in the opposite array, said third array of grooves having one half the number of grooves of said first and second arrays, with the grooves in said third array being aligned axially with every other groove in said second array, said first and said second arrays having the entranceway to each groove cammed such that movement of said lug means from a groove in one array to the other causes a rotation of said detent cylinder about its axis an amount corresponding to the pitch distance between opposite grooves in said first and said second arrays of grooves.

9. The control rod assembly of claim 8 wherein said lug means comprises at least one protruding member fixedly mounted to said control rod, and said control rod assembly further comprises a biasing member included with said drive shaft assembly positioned to hold said lug means against a shoulder formed within said detent cylinder so as to maintain connection of said drive shaft assembly with said control rod.

* * * * *